Nov. 29, 1949  E. O. RODAWAY  2,489,931
PUMP
Filed Oct. 25, 1945  2 Sheets-Sheet 1

Inventor
E. O. Rodaway
By Hiscock Downing Seebold
Attys

Nov. 29, 1949 E. O. RODAWAY 2,489,931
PUMP
Filed Oct. 25, 1945 2 Sheets-Sheet 2
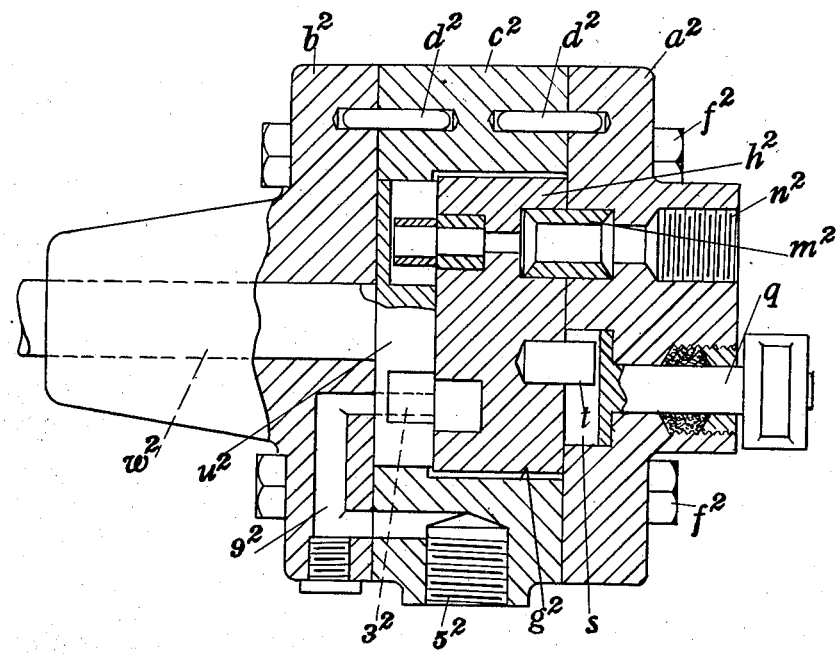

Patented Nov. 29, 1949

2,489,931

UNITED STATES PATENT OFFICE 2,489,931

PUMP

Edgar Orlando Rodaway, Birmingham, England, assignor to Thomas Savery Pumps Limited, Birmingham, England Application October 25, 1945, Serial No. 624,490
In Great Britain October 18, 1944

1 Claim. (Cl. 103—120)

This invention has for its object to provide improved rotary pumps of the kind comprising a pair of relatively rotatable and adjustable members one of which has in one of its end faces an annular groove containing segmental impellers engaged by the other member.

In the accompanying sheets of explanatory drawings —

Figure 3 is a similar view to Figure 1 illustrating a modified form of the invention.

Figure 1:
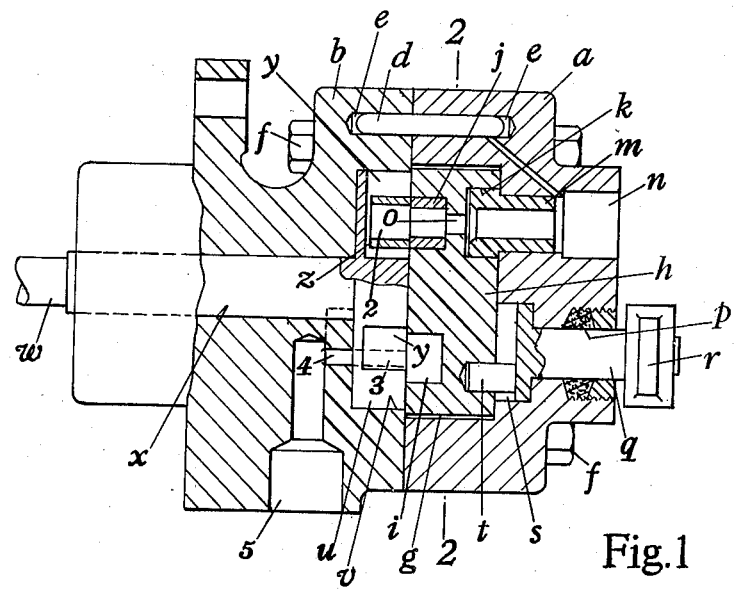
Figure 1 is a sectional side view of a rotary pump embodying the invention.
Figure 2:
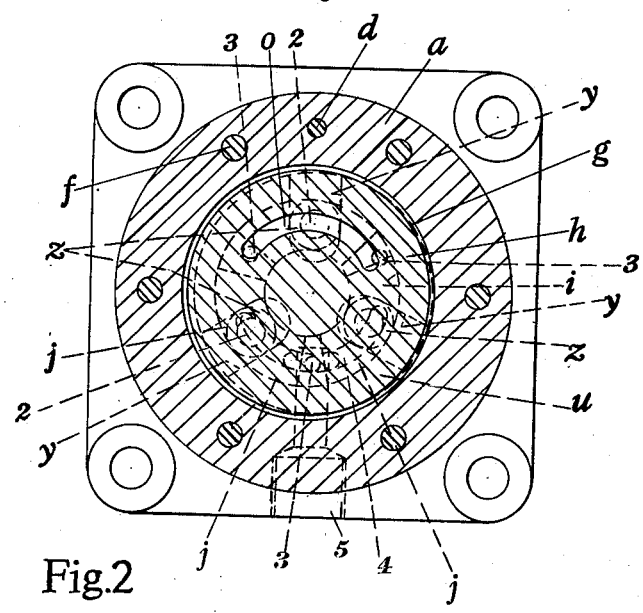
Figure 2 is a section on the line 2—2 of Figure 1.

In carrying the invention into effect as shown in Figures 1 and 2, I employ a housing which consists of two parts $a$, $b$ arranged end to end with their inner end faces in contact with each other and in a plane at right angles to the axis of the pump. The two housing parts $a$, $b$ are located in the desired angular relationship to each other by a pin $d$ engaging holes in $e$ in the adjacent ends of the said parts, and are secured together by bolts $f$. In a recess $g$ in the inner end of the housing part $a$ is located a circular block $h$ (herein termed the channelled member) having an end face coplanar with the inner end face of the said part, and in this end face of the channelled member is formed an annular channel $i$ which contains three segmental impellers $j$. In the other end of the channelled member $h$ is formed a circular hole $k$ having its axis parallel with and at a convenient distance from the axis of the channelled member, and on the adjacent part $a$ of the housing is formed or secured a hollow trunnion $m$ which enters the hole $k$ and serves to form a pivot for the channelled member. The trunnion $m$ forms a part of a fluid inlet passage which communicates with an inlet connection $n$ in the part $a$ of the housing. The hole $k$ in the channelled member $h$ does not completely penetrate this member, but opens into a segmental inlet port $o$ of suitable width and length formed in the base of the annular channel $i$.

Also in the housing part $a$ is formed a hole $p$ which is situated parallel with the axis of the trunnion $m$ and at the opposite side of the central axis of the housing, and in this hole is mounted a spindle $q$ which at its outer end is provided with an actuating lever $r$. The inner end of the spindle $q$ is enlarged and formed with a transverse groove $s$ which is engaged by a peg $t$ extending from the adjacent face of the channelled member $h$, the arrangement being such that actuation of the spindle $q$ serves to rock the channelled member $h$ about its pivot axis for the purpose of varying the eccentricity of the axis of the channelled member relatively to the driving member $u$ to be hereinafter described, and thereby varying the output of the pump from a maximum to a minimum (which may be zero). The extent of adjustment of output is limited by the clearance between the outer periphery of the channelled member $h$ and the inner periphery of the recess $g$ in the housing part $a$ in which it is accommodated. In one limit the channelled member $h$ abuts against one side of the recess $g$, and in the other limit it abuts against the opposite side.

In a recess $v$ in the inner end face of the other housing part $b$ is mounted the driving member $u$ which consists of a disc secured or formed on one end of a driving spindle $w$ extending through an axial hole $x$ in the housing part, one face of the disc being coplanar with the inner end face of the housing part. In this face of the driving member $u$ are formed three radial grooves $y$ which are engaged by rollers $z$ mounted on pins 2 extending from the impellers $j$, and equidistantly between these grooves there are formed in the driving member three delivery ports 3 which penetrate the driving member and which during rotation of the latter successively pass over a segmental discharge port 4 of appropriate length and width formed in the base of the recess $v$ in the housing part $b$, this port being in communication with a discharge connection 5 in the said housing part.

When the pump above described is in action, the axis of the driving member $u$ is eccentric to or out of line with the axis of the channelled member $h$. In this condition of the pump rotation of the driving member $u$ causes the impellers $j$ to move with it, and on account of the relative eccentricities of the driving and channelled members $u$, $h$ the spaces between the impeller ends alternately expand and contract during each rotation. While these spaces are expanding liquid is drawn into them from the inlet connection $n$, and while these spaces are subsequently contracting the liquid is discharged through the adjacent port 3 in the driving member $u$ to the discharge port 4 and discharge connection 5 in the housing part $b$. During the relatively short intervals in which the spaces between the ends of the impellers $j$ are isolated from the inlet and discharge connections $n$, 5, there is little or no change in the volume of these spaces. The output of the pump can be varied by appropriate variation of the amount by which the axis of the channelled member $h$ is eccentric to or out of line with the axis of the driving member $u$, the output being reduced to zero when the two axes are in alignment.

In the modification shown in Figure 3, in which the parts similar or analogous to those shown in Figures 1 and 2 are indicated by the same reference characters suffixed by 2, I employ a three-part housing which consists of a central part $c^2$ having a stepped cylindrical bore $g^2$, and a pair of end parts $a^2$, $b^2$ fitting closely against the end faces of the central part, the three parts being located in the required relative positions by pins $d^2$, and being secured together by bolts $f^2$. The channelled member $h^2$ and the driving member $u^2$ are situated in the opposite ends of the bore $g^2$ in the central part $c^2$ of the housing, the part of the bore which accommodates the channelled member being of sufficient diameter to allow the required pivotal movement of this member. The pivot $m^2$ for the channelled member $h^2$, the inlet connection $n^2$ and the means $q$, $s$, $t$ for adjusting the channelled member are all carried on the end part $a^2$ of the housing. The driving spindle $w^2$ extending from the driving member $u^2$ passes through the other end part $b^2$ of the housing. The discharge connection $5^2$ may be provided in the latter end part $b^2$ or in the central part $c^2$ of the housing, and in the latter case the discharge connection is adapted to communicate with the ports as $3^2$ in the driving member $u^2$ through a passage $9^2$ in the adjacent end part $b^2$ of the housing.

By this invention I am able to provide for variation of the output of pumps of the kind specified in a very simple manner. The invention is not, however, restricted to the examples described and subordinate details may be modified to suit different requirements.

Having thus described my invention, what I claim as new and desire to secure by Letters Patent is:

A rotary pump of the kind specified, comprising the combination with a housing having an inlet and an outlet for fluid, of a channelled member provided at one side with an annular channel and located in said housing, segmental impellers mounted in spaced relationship in said channel and movable relatively thereto, a separate pivot connecting said channelled member at the side remote from said channel to said housing and having formed therein a passageway which at one end communicates with said inlet, an arcuate port formed in said channelled member and serving to establish communication between the other end of said passageway and said channel so that said passageway and port can serve to conduct fluid from said inlet to the spaces between the ends of said impellers, a rotary driving member in engagement with said impellers, ports formed in said driving member so that they constantly communicate with the open side of said channel and intermittently communicate with said outlet during rotation of said driving member for enabling fluid to be discharged by said impellers from the spaces therebetween to said outlet, and means for moving said channelled member about its pivot axis for varying the pump output.

EDGAR ORLANDO RODAWAY.

REFERENCES CITED

The following references are of record in the file of this patent:

UNITED STATES PATENTS

| Number | Name | Date |
|---|---|---|
| 2,142,275 | Lane | Jan. 3, 1939 |
| 2,243,653 | Rodaway | May 27, 1941 |
| 2,322,568 | DeLancey | June 22, 1943 |

FOREIGN PATENTS

| Number | Country | Date |
|---|---|---|
| 27,681 | Great Britain | 1908 |